(12) United States Patent
Boorse

(10) Patent No.: US 9,145,809 B2
(45) Date of Patent: **\*Sep. 29, 2015**

(54) MULTI-COMPONENT FILTERS FOR EMISSIONS CONTROL

(71) Applicant: BASF Corporation, Florham Park, NJ (US)

(72) Inventor: R. Samuel Boorse, Skillman, NJ (US)

(73) Assignee: BASF CORPORATION, Florham Park, NJ (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/247,206

(22) Filed: Apr. 7, 2014

(65) Prior Publication Data

US 2014/0219880 A1 Aug. 7, 2014

Related U.S. Application Data

(63) Continuation of application No. 13/433,663, filed on Mar. 29, 2012, now Pat. No. 8,722,000.

(60) Provisional application No. 61/468,859, filed on Mar. 29, 2011.

(51) Int. Cl.
*F01N 3/28* (2006.01)
*B01D 53/94* (2006.01)
(Continued)

(52) U.S. Cl.
CPC .......... *F01N 3/2882* (2013.01); *B01D 53/9445* (2013.01); *B01D 53/9463* (2013.01); *B01D 53/9468* (2013.01); *F01N 3/0222* (2013.01); *F01N 3/035* (2013.01); *F01N 3/101* (2013.01); *F01N 3/106* (2013.01); *F01N 3/2066* (2013.01);
(Continued)

(58) Field of Classification Search
CPC .................................. F01N 3/28; B01D 53/94
USPC ................ 502/60, 64, 300, 304, 309, 527.12, 502/527.13; 95/285; 423/213.2, 213.5, 423/213.7; 60/274, 297, 299, 301, 311
See application file for complete search history.

(56) References Cited

U.S. PATENT DOCUMENTS 6,753,294 B1 6/2004 Brisley et al.
7,097,817 B2 8/2006 Brisley et al.
(Continued)

FOREIGN PATENT DOCUMENTS

DE 102008055890 5/2010
EP 1486248 12/2004
(Continued)

OTHER PUBLICATIONS

Non-Final Office Action in U.S. Appl. No. 13/433,663, dated Nov. 12, 2013, 12 pgs.

*Primary Examiner* — Timothy Vanoy
(74) *Attorney, Agent, or Firm* — Servilla Whitney LLC

(57) ABSTRACT

Catalytic articles, systems and methods for treating exhaust gas streams are described. A catalytic article comprising a wall flow filter having gas permeable walls, a hydrolysis catalyst, an optional soot oxidation catalyst, a selective catalytic reduction catalyst permeating the walls, an ammonia oxidation catalyst and an oxidation catalyst to oxidize CO and hydrocarbons is described. Methods of treating exhaust gas streams comprising soot, an ammonia precursor such as urea, ammonia, $NO_x$, CO and hydrocarbons are also provided.

25 Claims, 5 Drawing Sheets

(51) Int. Cl.
*F01N 3/10* (2006.01)
*F01N 3/20* (2006.01)
*F01N 3/022* (2006.01)
*F01N 3/035* (2006.01)

(52) U.S. Cl.
CPC .......... *B01D 53/944* (2013.01); *B01D 53/9418* (2013.01); *B01D 53/9436* (2013.01); *B01D 2255/9155* (2013.01); *B01D 2258/012* (2013.01); *F01N 2240/40* (2013.01); *F01N 2370/02* (2013.01); *F01N 2510/06* (2013.01); *F01N 2510/0682* (2013.01); *F01N 2570/18* (2013.01); *Y02T 10/24* (2013.01)

(56) References Cited

U.S. PATENT DOCUMENTS

| | | | |
|---|---|---|---|
| 7,119,044 | B2 | 10/2006 | Wei et al. |
| 8,844,274 | B2 * | 9/2014 | Lambert et al. ................. 60/297 |
| 2003/0198583 | A1 | 10/2003 | Zhang |
| 2007/0049492 | A1 | 3/2007 | Miyairi et al. |
| 2007/0224092 | A1 | 9/2007 | Miyairi et al. |
| 2009/0163354 | A1 | 6/2009 | Andy et al. |
| 2009/0180943 | A1 | 7/2009 | Caudle |
| 2010/0058746 | A1 | 3/2010 | Pfeifer et al. |
| 2010/0175372 | A1 | 7/2010 | Lambert et al. |
| 2010/0300078 | A1 | 12/2010 | Lu et al. |
| 2011/0229391 | A1 | 9/2011 | Paulus et al. |
| 2013/0216439 | A1 | 8/2013 | Johansen |
| 2013/0216441 | A1 | 8/2013 | Johansen |

FOREIGN PATENT DOCUMENTS

| | | |
|---|---|---|
| EP | 2426326 | 3/2012 |
| FR | 2952123 | 5/2011 |
| JP | 2007-239752 | 9/2007 |
| JP | 2007-247652 | 9/2007 |
| WO | WO-2007/116194 | 10/2007 |
| WO | WO-2008/122023 | 10/2008 |
| WO | WO-2009/093071 | 7/2009 |
| WO | WO-2011/041769 | 4/2011 |

* cited by examiner

MULTI-COMPONENT FILTERS FOR EMISSIONS CONTROL

CROSS-REFERENCE TO RELATED APPLICATIONS

This application is a continuation under 35 U.S.C. §120 of U.S. patent application Ser. No. 13/433,663, filed Mar. 29, 2012, now U.S. Pat. No. 8,722,000, issued May 13, 2014, which claims priority to U.S. Provisional Application No. 61/468,859, filed Mar. 29, 2011, the entire contents thereof are incorporated herein by reference.

BACKGROUND

The present invention relates to catalytic articles, emissions treatment systems including catalytic articles, and methods for reducing contaminants in exhaust gas streams. More specifically, the present invention is concerned with multi-component filters, systems and methods for their use with lean burn engines, including diesel engines and lean burn gasoline engines.

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their durability, and their ability to generate high torque at low speed.

Diesel engine exhaust is a heterogeneous mixture that contains particulate emissions such as soot and gaseous emissions such as carbon monoxide, unburned or partially burned hydrocarbons, and nitrogen oxides (collectively referred to as $NO_x$), but also condensed phase materials (liquids and solids) which constitute the so-called particulates or particulate matter. Catalyst compositions, often disposed on one or more monolithic substrates, are placed in engine exhaust systems to convert certain or all of these exhaust components to innocuous compounds. For example, diesel exhaust systems can contain one or more of a diesel oxidation catalyst, a soot filter and a catalyst for the reduction of $NO_x$. These components are costly and take up considerable space on the vehicle.

Therefore, there is an ongoing need to improve the efficiency of exhaust treatment systems without increasing the size and complexity of such systems.

SUMMARY

Embodiments of the invention are directed to catalytic articles to remove emissions from a gas stream containing soot, ammonia, an ammonia precursor $NO_x$, CO and hydrocarbons. The catalytic article comprises a wall-flow filter for trapping soot in the gas stream. The filter has an inlet end and an outlet end defining an overall length. The filter has gas permeable walls having a thickness formed into a plurality of axially extending inlet channels and outlet channels. Each inlet channel has inlet walls, an open inlet end and a plugged outlet end and each outlet channel has outlet walls, a plugged inlet end and an open outlet end. Each inlet channel has adjacent outlet channels. The article includes an optional hydrolysis catalyst that promotes the hydrolysis of the ammonia precursor. The hydrolysis catalyst is coated on a portion of the inlet walls of the inlet channels extending from the inlet end. A selective catalytic reduction catalyst permeates the gas permeable walls to promote the conversion of $NO_x$ in the gas stream to $N_2$ in the presence of excess oxygen. An ammonia oxidation catalyst coats a length of the outlet walls of the outlet channels to promote the selective oxidation of ammonia to $N_2$ in the gas stream. An oxidation catalyst is coated on a portion of the outlet walls of the outlet channels extending from the outlet end toward the inlet end to promote the oxidation of CO and hydrocarbons to $CO_2$. In one or more embodiment, the wall flow filter is a high efficiency filter.

In some embodiments, the hydrolysis catalyst is present and extends from the inlet end to about 50% of the length of the wall flow filter, and arranged so that the gas stream encounters the hydrolysis catalyst first. In some embodiments, the hydrolysis catalyst is present and extends from the inlet end to a length in the range of about one quarter inch to about 10% of the length of the wall flow filter. In one or more embodiments, the hydrolysis catalyst is present and comprises titania.

In one or more embodiments, the selective catalytic reduction catalyst extends along the entire length of the wall flow filter. In some embodiments, the selective catalytic reduction catalyst has a loading in the range of about 0.25 $g/in^3$ to about 2.5 $g/in^3$. In one or more embodiments, the selective catalytic reduction catalyst comprises a metal promoted molecular sieve.

Some embodiments of the catalytic article further comprise a soot oxidation catalyst before the SCR catalyst. In one or more embodiments, the soot oxidation catalyst permeates the gas permeable walls. In some embodiments, the soot oxidation catalyst comprises a layer permeating an inlet side of the gas permeable walls. According to some embodiments, the layer permeates the gas permeable walls to a depth up to about 50% of the wall thickness. In explicit embodiments, the soot oxidation catalyst comprises a layer on the inlet walls. The soot oxidation catalyst of one or more embodiments comprises zirconia stabilized cerium oxide.

In some embodiments, the ammonia oxidation catalyst extends up to about 50% of the overall length of the catalytic article. In some embodiments, the ammonia oxidation catalyst extends from the oxidation catalyst up to about 50% of the overall length of the catalytic article.

In one or more embodiments, the oxidation catalyst extends from the outlet end of outlet channels up to a length of about two inches. In some embodiments, the oxidation catalyst overlaps a portion of the ammonia oxidation catalyst. In one or more embodiments, there is substantially no overlap of the oxidation catalyst on the ammonia oxidation catalyst. The oxidation catalyst of some embodiments comprises a platinum group metal on a high surface area support.

Additional embodiments of the invention are directed to methods of treating an exhaust gas stream comprising soot, urea, ammonia, $NO_x$, CO and hydrocarbons. A hydrolysis catalyst located at an inlet end of inlet channels of a catalytic article promotes the hydrolysis of urea. The soot is filtered from the gas stream after the hydrolysis catalyst by passing the gas stream through a gas permeable wall in the catalytic article and forming a filter cake on the wall of the inlet channels. The ammonia and $NO_x$ is reacted to form $N_2$ by promotion with a selective catalytic reduction catalyst permeating the gas permeable wall of the catalytic article. The ammonia is oxidized in the gas stream exiting the gas permeable walls of the catalytic article by promotion of an ammonia oxidation catalyst coated on outlet walls of the catalytic article. The CO and hydrocarbons are oxidized to form carbon dioxide and water by promotion of an oxidation catalyst coated on the outlet walls at an outlet end of the catalytic article.

In some embodiments, the soot is oxidized with the promotion of a soot oxidation catalyst before the selective catalytic reduction catalyst. In one or more embodiments, the soot is oxidized after formation of the filter cake.

Further embodiments of the invention are directed to emissions treatment systems comprising an engine and the catalytic article described herein located downstream of and in flow communication with the engine. In some embodiments, the emissions treatment system further comprises a diesel oxidation catalyst positioned downstream of the engine and upstream of the catalytic article and in flow communication with both. In one or more embodiments, the emissions treatment system further comprises a reductant injector positioned upstream of the catalytic article.

DETAILED DESCRIPTION

Figure 1:
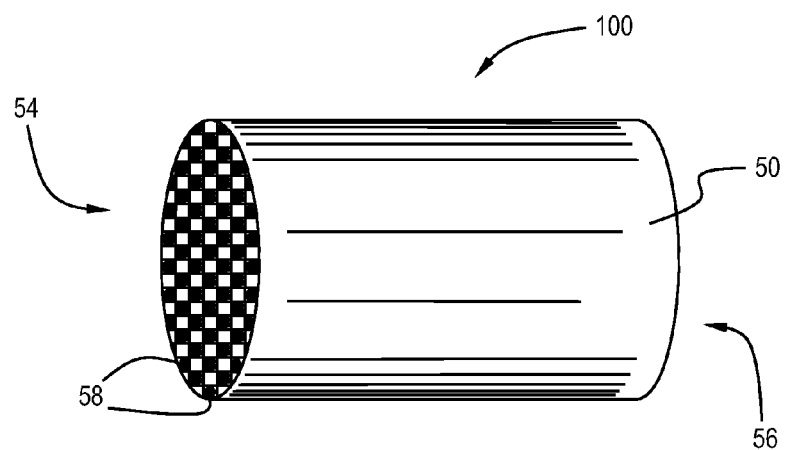
FIG. 1 shows a perspective view of a catalytic article in accordance with one or more embodiments of the invention.

Before describing several exemplary embodiments of the invention, it is to be understood that the invention is not limited to the details of construction or process steps set forth in the following description. The invention is capable of other embodiments and of being practiced or being carried out in various ways.

The following terms shall have, for the purposes of this application, the respective meanings set forth below.

"Platinum group metal components" refer to platinum group metals or one of their oxides. The platinum group metals include platinum, palladium, rhodium, ruthenium, osmium and iridium.

"Washcoat" has its usual meaning in the art of a thin, adherent coating of a catalytic or other material applied to a refractory substrate, such as a honeycomb flow through monolith substrate or a filter substrate, which is sufficiently porous to permit the passage there through of the gas stream being treated.

The term "washcoat" refers to a catalyst coating comprised of powdered material on a substrate, the powdered material obtained from a dried slurry of insoluble oxides or salts in a liquid medium, typically an aqueous medium. Washcoats are distinguished from impregnation of catalytic material of solutions of soluble precursors applied to a substrate such as by solution impregnation. Washcoats are also distinguished from processes of growing thin films by oxide growth processes or sol-gel processes.

Where they appear herein, the terms "exhaust stream" and "engine exhaust stream" refer to the engine out effluent as well as to the effluent downstream of one or more other catalyst system components including but not limited to a diesel oxidation catalyst and/or soot filter.

"How communication" means that the components and/or conduits are adjoined such that exhaust gases or other fluids can flow between the components and/or conduits.

"Downstream" refers to a position of a component in an exhaust gas stream in a path further away from the engine than the component preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine in relation to another component.

The term "abate" means to decrease in amount and "abatement" means a decrease in the amount, caused by any means.

"Selective catalytic reduction catalyst" or "SCR catalyst" refers to a catalyst that is effective to promote the conversion $NO_x$ in the gas stream to nitrogen in the presence of excess oxygen. The terms "SCR function" or "SCR reaction" will be used herein to refer to a chemical process described by the stoichiometric Eq 1. The SCR catalyst is effective to promote the reaction over the operating temperature range of a lean burn engine, for example from 150° C. to about 500° C. or from about 200° C. to about 450° C. Accordingly, platinum group metals are excluded as "SCR catalysts" because above about 200-250° C., such materials do not promote the SCR reaction.

As is well understood by those skilled in the art, catalysts are substances which affect the rate of a chemical reaction. When a catalyst is referred to as converting a species, or reacting with a species, and the like, the catalyst is promoting (e.g., catalyzing) the reaction, not becoming consumed in the reaction. For example, it may be said that an SCR catalyst converts $NO_x$ to nitrogen in the presence of excess oxygen. It will be understood by those skilled in the art that this means that the SCR catalyst promotes the conversion of $NO_x$ to nitrogen in the presence of excess oxygen.

Embodiments of the invention are directed to single filter substrates with multiple functions for emission control. To obtain the multiple functions of emission control, the sequence of catalysts that the gas flow encounters is described. In one embodiment, the gas contacts a hydrolysis catalyst coated on the inlet channel walls at the inlet end of a substrate. Thus, there is a zone of hydrolysis catalyst on the inlet walls in the plug region of the filter and possibly extending a short way into the wall flow region. An SCR catalyst is disposed in the wall between the inlet plugs and the outlet plugs. An ammonia oxidation catalyst is disposed on the outlet channel walls upstream of the plug area and a CO/hydrocarbon oxidation catalyst is coated as a zone on the outlet channel walls in the plug zone. The as containing soot, urea, ammonia, isocyanic acid (also called an ammonia precursor), water, $NO_x$, CO and hydrocarbons exhaust stream first encounters the hydrolysis catalyst where the decomposition of urea (and the ammonia precursor) is completed, then the filter wall where the soot is filtered from the stream, then the SCR catalyst where the ammonia and $NO_x$ react to form $N_2$, then to the ammonia oxidation catalyst where the excess or residual ammonia is removed and finally the CO/hydrocarbon oxidation catalyst where any residual CO or hydrocarbons are oxidized to carbon dioxide and water. During active regeneration, the CO produced from the partial oxidation of the soot on the filter is also reacted on the CO/hydrocarbon oxidation catalyst. Embodiments of this variety may be referred to as 6-way catalysts.

In another embodiment, the sequence is the same with the addition of a soot oxidation catalyst disposed either on the inlet channel wall or in the wall directly adjacent to the inlet channel. The soot oxidation catalyst will aid in the passive regeneration of the soot during normal operation, and the soot oxidation catalyst generally should not react with the incident ammonia which will react with the SCR catalyst below it. Alternatively, the soot oxidation catalyst and the SCR catalyst could be in admixture or co-mixed and spread throughout the wall to allow for the simultaneous oxidation of soot and selective reduction of $NO_x$. Embodiments of this variety may be referred to as 7-way catalysts.

An aspect of the invention pertains to a catalyst. According to one or more embodiments, the catalyst may be disposed on a monolithic substrate as a washcoat layer. As used herein and as described in Heck, Ronald and Robert Fanauto, Catalytic Air Pollution Control, New York: Wiley-Interscience, 2002, pp. 18-19, a washcoat layer includes a compositionally distinct layer of material disposed on the surface of the monolithic substrate or an underlying washcoat layer. A catalyst can contain one or more washcoat layers, and each washcoat layer can have unique chemical catalytic functions.

Figure 2:
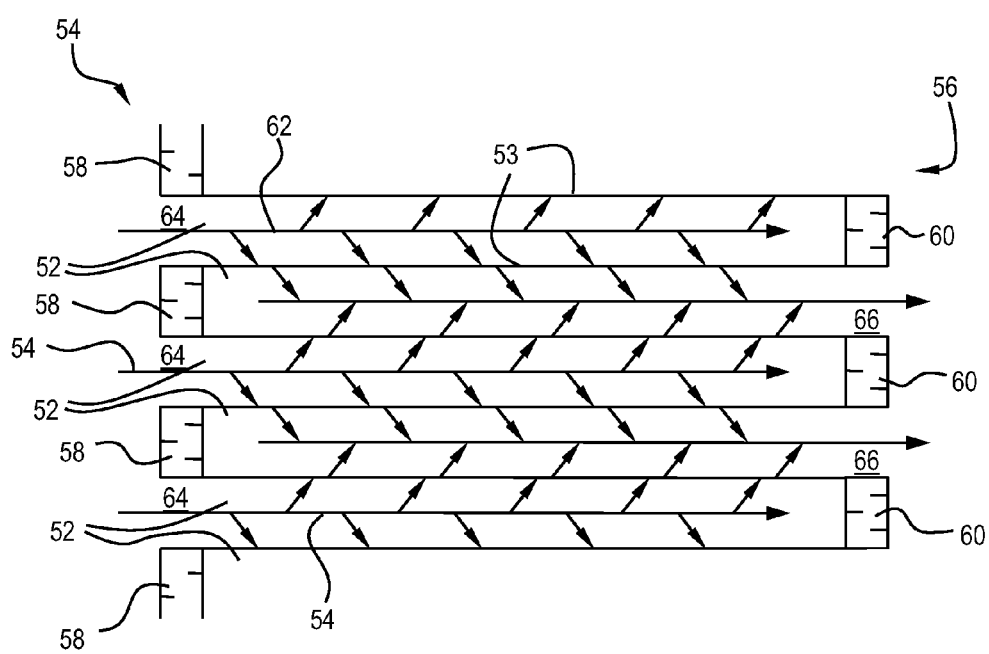
FIG. 2 shows a schematic cross-sectional view of a wall flow monolith in accordance with one or more embodiments of the invention.
Figure 3:
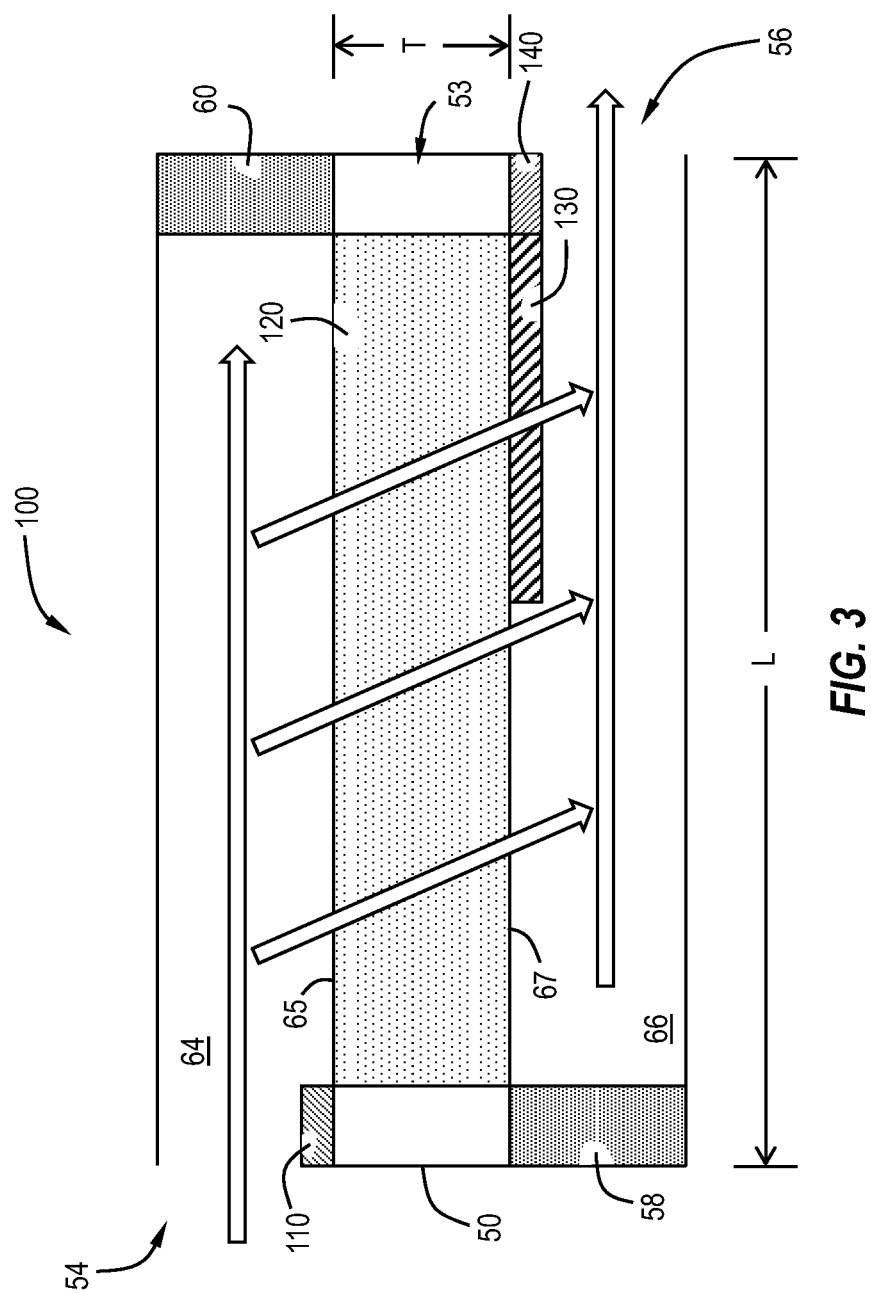
FIG. 3 shows a schematic cross-sectional view of a catalytic article in accordance with one or more embodiments of the invention.

To provide a single filter substrate with multiple emission control functions, it is desirable to control the sequence of catalysts that the gas flow encounters. One or more embodiments of the invention are directed to catalytic articles 100 to remove emissions from a gas stream containing soot ammonia, an ammonia precursor, $NO_x$, CO and hydrocarbons. With reference to FIGS. 1-3, the catalytic articles 100 comprise a substrate 50, often referred to as a carrier or carrier substrate. In one or more embodiments, the substrate 50 is a wall-flow filter. The substrate 50 has an inlet end 54 and an outlet end 56 defining an overall length L. The substrate 50 also has gas permeable walls 53 having a thickness T formed into a plurality of axially extending inlet channels 64 and outlet channels 66. Each inlet channel 64 has inlet walls 65, an open inlet end 54 and an outlet end 56 with an outlet plug 60. Each outlet channel 66 has outlet walls 67, an inlet end 54 with an inlet plug 58 and an open outlet end 56. Each inlet channel 64 has adjacent outlet channels 66 which form opposing checkerboard patterns at the inlet end 54 and outlet end 56 as shown in FIG. 2. A gas stream entering through the unplugged inlet end 54 of an inlet channel 64 is stopped by the outlet plug 60 and diffuses through the gas permeable walls 53 into the outlet channels 66. The gas cannot pass back to the inlet channels 64 because of the pressure drop across the wall 53. In general the inlet plugs 58 prevent gases from entering the outlet channel 66 directly and may help prevent flow across the wall from outlet to inlet. The substrate 50 is effective to remove at least some of the particulate matter from the gas stream.

Figure 4:
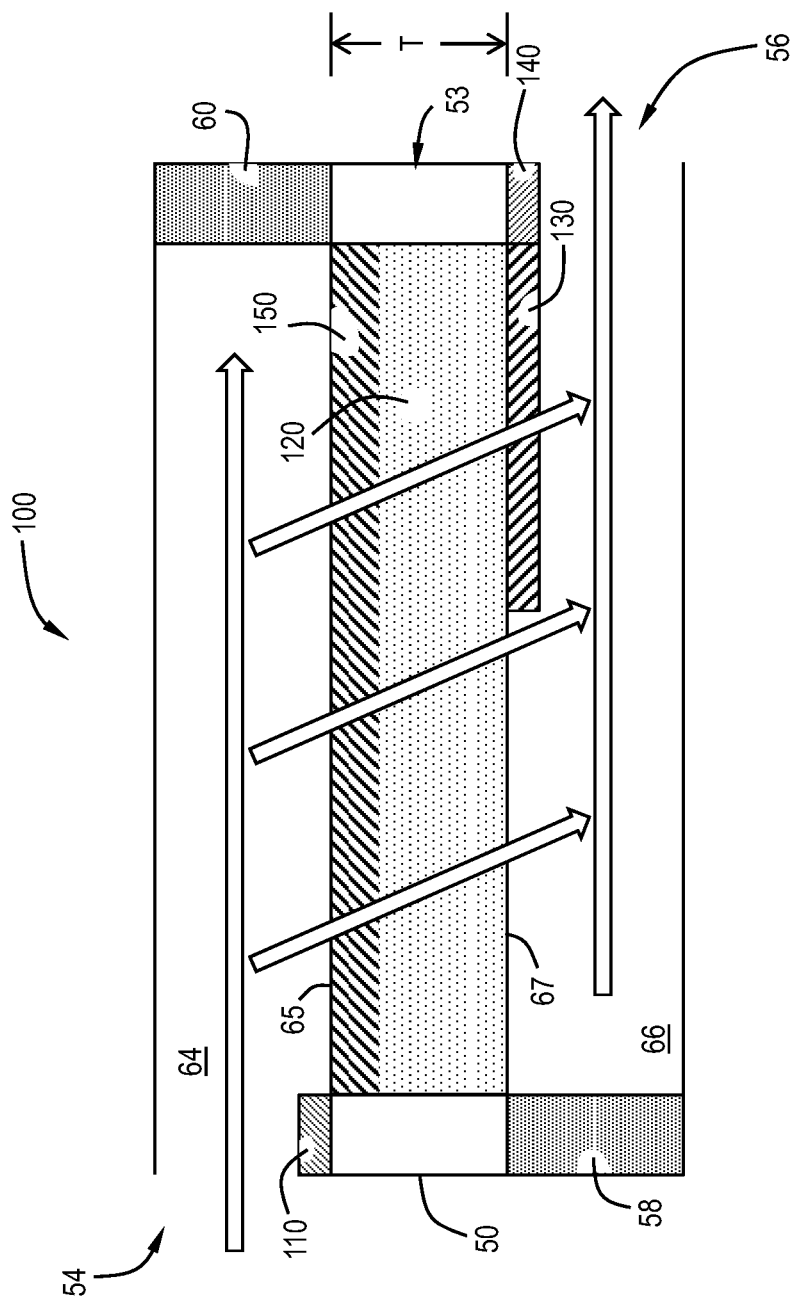
FIG. 4 shows a schematic cross-sectional view of a catalytic article in accordance with one or more embodiments of the invention.

Referring to FIGS. 3 and 4, some embodiments of the invention include an optional hydrolysis catalyst 110 that promotes the hydrolysis of the ammonia precursor. While it may be said the that hydrolysis catalyst hydrolyzes the ammonia precursor, it will be understood by those skilled in the art that the hydrolysis catalyst does not actually hydrolyze the ammonia precursor, but promotes the hydrolysis reaction of the ammonia precursor. The hydrolysis catalyst 110 is often referred to as a urea hydrolysis catalyst. However, and without being bound by any particular theory of operation, it is understood by those skilled in the art that the urea hydrolysis catalyst catalyzes the hydrolysis of a thermal degradation product of urea, isocyanic acid. The hydrolysis catalyst 110 is coated on a portion of the inlet walls 65 extending from the inlet end 54 of the substrate 50. In one or more embodiments, the hydrolysis catalyst 110 is arranged (positioned) so that the gas stream encounters the hydrolysis catalyst 110 first (i.e., before encountering other catalysts).

The length that the hydrolysis catalyst 110 extends along the length L of the substrate 50 can vary depending on the requirements of the resultant catalytic article 100. In some embodiments, the hydrolysis catalyst 110 extends from the inlet end 54 to about 50% of the length of the substrate 50. In one or more embodiments, the hydrolysis catalyst 110 extends the same length as the inlet plugs 58 of the adjacent gas channels. In various embodiments, the hydrolysis catalyst 110 extends from the inlet end 54 to a length in the range of about 5% to about 50% of the length of the substrate 50, or in the range of about ¼ inch to about 50% of the length of the substrate 50, or in the range of about 5% to about 10% of the length of the substrate 50, or a length of about ¼ inch, or a length of greater than about ¼ inch, or a length greater than about 5%, 10%, 15%, 20%, 25%, 30%, 35%, 40% or 45% of the length of the substrate 50, or a length less than about 70%, 60%, 50%, 40%, 30%, 20% or 10% of the length of the substrate 50. In one or more embodiments, the hydrolysis catalyst 110 extends from the inlet end 54 of the substrate 50 to a length in the range of about one quarter inch to about 10% of the length L of the substrate.

The hydrolysis catalyst 110 has a particle size which is effective to ensure that substantially all of the hydrolysis catalyst 110 remains on the surface of the inlet wall 65. As used in this specification and the appended claims, the term "substantially all of the hydrolysis catalyst remains on the surface" means that less than about 20% of the hydrolysis catalyst 110 permeates the porous wall 53 of the substrate 50.

The hydrolysis catalyst can be any suitable hydrolysis catalyst known to those skilled in the art. In some embodiments, the hydrolysis catalyst comprises one or more of titania, gamma-alumina and transition metal oxides. Either of these materials can be stabilized or unstabilized. The stabilizing agent can be any suitable stabilizing agent including, but not limited to ceria, zirconia, lanthana, titania, tungsten and silica.

The substrate 50 includes a selective catalytic reduction catalyst 120 (SCR catalyst) permeating the gas permeable walls 53. The SCR catalyst 120 is effective to promote the conversion of $NO_x$ in the gas stream to nitrogen in the presence of excess oxygen. The terms "SCR function" or "SCR reaction" will be used herein to refer to a chemical process described by the stoichiometric Eq 1.

$$4NO_x+4NH_3+(3-2x)O_2 \rightarrow 4N_2+6H_2O \qquad \text{Eq 1}$$

More generally it will refer to any chemical process in which $NO_x$ and $NH_3$ or other reductant is combined to produce preferably $N_2$. The term "SCR composition" refers to a material composition effective to catalyze the SCR function or effective to promote the conversion of $NO_x$. As used herein, the term "permeate" when used to describe the dispersion of a catalyst on the substrate, means that the catalyst composition is dispersed throughout the wall of the substrate. A composition that permeates the walls is distinguished from a composition that coats the exterior of the walls and does not reside within the pores throughout the wall of the substrate. In some embodiments, the SCR composition has a soot oxidation function.

To ensure that the entire exhaust gas stream passes through the SCR catalyst 120 (i.e., to avoid bypassing the catalyst), the SCR catalyst extends along substantially the entire length of the wall flow filter. As used herein, the term "substantially the entire length" means that the SCR catalyst 120 extends at least about 95% of the entire length, with any portion(s) not including the SCR catalyst 120 being located at any place along the length of the substrate 50.

In some embodiments, the SCR component includes a metal promoted molecular sieve. That is, a molecular sieve onto which a metal from one of the groups VB, VIIB, VIIB, VIIIB, IB, or IIB of the periodic table has been deposited onto extra-framework sites on the external surface or within the channels, cavities, or cages of the molecular sieves. Metals may be in one of several forms, including, but not limited to, zerovalent metal atoms or clusters, isolated cations, mononuclear or polynuclear oxycations, or as extended metal oxides. In one or more embodiments, the metals include iron, copper, and mixtures or combinations thereof.

The molecular sieve may be a microporous aluminosilicate zeolite having any one of the framework structures listed in the *Database of Zeolite* Structures published by the International Zeolite Association (IZA). The framework structures include, but are not limited to those of the CHA, FAU, BEA, MFI, MOR types. Non-limiting examples of aluminosilicate zeolites having these structures include chabazite, faujasite, zeolite Y, ultrastable zeolite Y, beta zeolite, mordenite, silicalite, zeolite X, and ZSM-5.

In a one or more embodiment, the SCR component includes an aluminosilicate molecular sieve having a CHA crystal framework type, an SAR greater than about 15, and copper content exceeding about 0.2 wt %. In a more specific embodiment, the SAR is at least about 10, and copper content from about 0.2 wt % to about 5 wt %. Zeolites having the CHA structure, include, but are not limited to natural chabazite, SSZ-13, LZ-218, Linde D, Linde R, Phi, ZK-14, and ZYT-6. Other suitable zeolites are also described in U.S. Pat. No. 7,601,662 entitled "Copper CHA Zeolite Catalysts," the entire content of which is incorporated herein by reference. In one or more embodiments, the SCR composition comprises a copper chabazite.

Molecular sieve compositions that have a zeolite framework structure but contain other components, for example, phosphorous, in the framework structure, can be utilized in the SCR component according to embodiments of the present invention. Non-limiting examples of other molecular sieve compositions suitable as an SCR component include sillicoaluminophosphates SAPO-34, SAPO-37, SAPO-44. Synthesis of synthetic form of SAPO-34 is described in U.S. Pat. No. 7,264,789, which is hereby incorporated by reference.

The selective catalytic reduction catalyst 120 can be present in any loading which is suitable to effectively promote the removal of $NO_x$ from the gas stream without causing a significant adverse impact on the system backpressure. In various embodiments, the SCR catalyst 120 has a loading in the range of about 0.25 g/in$^3$ to about 2.5 g/in$^3$, or in the range of about 0.38 g/in$^3$ to about 2.0 g/in$^3$, or in the range of about 0.5 g/in$^3$ to about 1.5 g/in$^3$, or in the range of about 0.63 g/in$^3$ to about 1.25 g/in$^3$.

Referring again to FIGS. 3 and 4, the catalytic article 100 includes an ammonia oxidation catalyst 130 on the outlet walls 67 of the outlet channels 66. The ammonia oxidation catalyst 130, also referred to as an ammonia oxidation composition, is effective to promote the oxidation of ammonia in the gas stream. The term "NH$_3$ oxidation function" will be used herein to refer to a chemical process described by Eq 2.

$$4NH_3 + 3O_2 \rightarrow 2N_2 + 6H_2O \qquad \text{Eq 2}$$

More generally, it will refer to a process in which NH$_3$ is reacted with oxygen to produce NO, NO$_2$, N$_2$O, or preferably N$_2$. The term "NH$_3$ oxidation composition" or "ammonia oxidation catalyst" refers to a material composition effective to catalyze the NH$_3$ oxidation function.

The ammonia oxidation catalyst 130 coats the entire length of or a portion of the length of the outlet walls 67. It may not be necessary to have the ammonia oxidation catalyst 130 coating the entire length of the outlet wall 67 to effectively promote the oxidation of the ammonia in the gas stream. When coating the entire length of the outlet wall 67, the back pressure in the system may increase to undesirable levels. In some embodiments, the ammonia oxidation catalyst 130 extends up to about 50% of the overall length of the catalytic article. The ammonia oxidation catalyst 130 in some embodiments extends from the oxidation catalyst 140 (discussed below) to up to about 50% of the overall length of the catalytic article. In various embodiments, the ammonia oxidation catalyst 130 extends a length in the range of about 5% to about 75%, or about 10% to about 65%, or about 15% to about 60%, or about 20% to about 55%, or in the range of about 25% to about 50% of the overall length of the substrate 50. In a variety of embodiments, the ammonia oxidation catalyst 130 extends in the range of about $\frac{1}{12}^{th}$ to about $\frac{1}{4}^{th}$ of the length of the substrate 50.

The ammonia oxidation catalyst 130 can be any suitable catalyst known to those skilled in the art. According to one or more embodiments, the ammonia oxidation catalyst 130 includes a zeolitic or non-zeolitic molecular sieve, which may have any one of the framework structures listed in the *Database of Zeolite Structures* published by the International Zeolite Association (IZA). The framework structures include, but are not limited to those of the CHA, FAU, BEA, MFI, and MOR types. In some embodiments, a molecular sieve may be exchanged with a metal component distributed on the external surface or in the channels, cavities, or cages of the molecular sieve.

The ammonia oxidation catalyst has two components; an SCR catalyst component and an oxidation catalyst component. The two components are generally present in two layers with the top coat (i.e., the first layer encountered by a gas stream) being the SCR catalyst component and the bottom layer (i.e., the second layer encountered by the gas stream) having the oxidation catalyst component. However, it is also possible to provide a single layer ammonia oxidation catalyst which includes a mixture of the SCR catalyst component and oxidation catalyst component. In some embodiments, the oxidation component layer contains a platinum group metal on alumina, or other support, directly on the substrate. In some embodiments, the ammonia oxidation catalyst comprises both an SCR catalyst and a platinum group metal containing catalyst and cannot be substantially free of either. As used in this specification and the appended claims, the term "cannot be substantially free of", when referring to an ammonia oxidation catalyst, means that the component in question is intentionally present in the composition. For example, if a composition is known to have a platinum group metal, then the composition is not substantially free of regardless of whether the platinum group metal is intentionally added or inherently present.

Use of only a platinum group metal can result in a composition with ammonia oxidation activity. However, compositions of this sort are not selective for the production of molecular nitrogen and may create undesirable products. In some embodiments, the ammonia oxidation catalyst has a selectivity for N$_2$ greater than about 70% at 300° C. In various embodiments, the ammonia oxidation catalyst has a selectivity for N$_2$ greater than about 50%, 55%, 60%, 65%, 75%, 80%, 85% or 90% when measured at 300° C.

Referring again to FIGS. 3 and 4, the catalytic article 100 includes an oxidation catalyst 140 coated on a portion of the outlet walls 67 of the outlet channels 66 of the substrate 50.

The oxidation catalyst 140 is coated on a portion of the substrate extending from the outlet end 56 of the substrate 50 toward the inlet end. The oxidation catalyst 140 of some embodiments is effective to promote the oxidation of carbon monoxide and hydrocarbons in the gas stream.

The length of the oxidation catalyst 140 can vary depending on the needs of the catalytic article 100. In various embodiments, the oxidation catalyst 140 extends from the outlet end 56 of the outlet channels 67 up to a length of about 3 inches, or about 2 inches, or about 1 inch, or about ½ inch, or about ¼ inch. In one or more embodiments, the oxidation catalyst 140 extends a length of the substrate 50 equal to about the length that the outlet plug 60 extends. This ensures that the gas stream diffusing through the porous wall 53 contacts the ammonia oxidation catalyst 130 before the oxidation catalyst 140.

In some embodiments, there is substantially no overlap of the oxidation catalyst 140 on the ammonia oxidation catalyst 130. As used in this specification and the appended claims, the term "substantially no overlap" when referring to the oxidation catalyst 140 means that less than about 10%, or about 5% of the length of the oxidation catalyst 140 overlaps the ammonia oxidation catalyst 130. In one or more embodiments, the oxidation catalyst 140 overlaps a portion of the ammonia oxidation catalyst 130.

The oxidation catalyst 140 can be any suitable oxidation catalyst known to those skilled in the art. In some embodiments, the oxidation catalyst 140 comprises a platinum group metal supported on a high surface area support (e.g., a refractory metal oxide). In one or more embodiments, the high surface area refractory metal oxide is an alumina or stabilized alumina. The oxidation catalyst 140 can be a single zone or multiple zones with each zone occupying a different length of the substrate. In a one or more embodiment, the oxidation catalyst comprises two zones, an inlet zone and an outlet zone.

Referring to FIG. 4, in some embodiments the catalytic article 100 can include a soot oxidation catalyst 150 before the SCR catalyst 120. The soot oxidation catalyst 150, as the name implies, is effective to promote the oxidation of the soot layer, or soot cake, that forms on the inlet wall 65 of the inlet channels 64 as the exhaust gas stream passes through the catalytic article 100.

The soot oxidation catalyst 150 can be coated on the inlet wall 65 of the inlet channels 64 or can permeate the inlet channel 64 side of the walls 53 of the substrate 53. In some embodiments, the soot oxidation catalyst 150 is coated on the inlet walls 65 of the inlet channels 64. When coated on the inlet walls 65, the soot oxidation catalyst 150 can extend the entire length of the substrate or a partial length of the substrate. When the soot oxidation catalyst 150 extends the entire length of the substrate, it forms a layer below the hydrolysis catalyst 110. When the soot oxidation catalyst 150 extends a partial length of the substrate, it can extend from about the end of the hydrolysis catalyst 110 to the outlet plug 60, or any portion there between.

In some embodiments, the soot oxidation catalyst 150 forming a layer permeating the porous wall 53 has a different composition to that of the SCR catalyst 120. When the soot oxidation catalyst 150 permeates the wall 53 of the substrate 50, it can form a layer on the inlet side of the wall 53, or can be intimately mixed with the SCR catalyst 120, or can be the same composition as the SCR catalyst 120. In some embodiments, the soot oxidation catalyst 150 layer permeates the inlet side of the gas permeable wall 53 to a depth of less than about 50% of the wall thickness T. In various embodiments, the soot oxidation catalyst 150 layer permeates the inlet side of the wall 53 to a depth of less than about 45%, 40%, 35%, 30%, 25%, 20%, 15%, 10% or 5% of the wall thickness T. In a variety of embodiments, the soot oxidation catalyst 150 layer extends a depth in the range of about 10% to about 40%, or in the range of about 20% to about 30% of the wall thickness T. In one or more embodiments, the soot oxidation catalyst 150 layer extends a depth of about 25% of the wall thickness T.

The soot oxidation catalyst 150 can be any suitable soot oxidation catalyst composition. Generally, the soot oxidation catalyst 150 is a highly selective material. While platinum group metals are capable of oxidizing soot, these materials also can oxidize ammonia which is undesirable. Therefore, in some embodiments the soot oxidation catalyst 150 comprises less than about 40% platinum group metal, or less than about 30% platinum group metal or less than about 20% platinum group metal or less than about 10% platinum group metal.

In one or more embodiments, the soot oxidation catalyst 150 is zirconia stabilized cerium oxide. The soot oxidation catalyst can be an SCR catalyst with some soot oxidation properties, such as vanadia. In some embodiments, the soot oxidation catalyst 150 is vanadia supported on titania or stabilized titania or cerium/zirconium mixture or a cerium phosphate or a spinel.

The Substrate

Suitable substrates for use with embodiments of the invention include wall flow filters. These filters, as shown in FIGS. 1 and 2 and described above generally have a plurality of fine, substantially parallel gas flow passages extending along the longitudinal axis of the substrate. Typically, each passage is blocked at one end of the substrate body, with alternate passages blocked at opposite end-faces. The passages can have any shape, including, but not limited to, rectangular, square, circular, oval, triangular, hexagonal, or other polygonal shapes. The thickness of the walls can vary depending on the desired properties of the resultant catalytic articles. In general, where the pore sizes are similar, a larger wall thickness will result in a greater impact on the system backpressure. Wall thickness typically range from about 0.002 to about 0.1 inches.

Suitable wall flow filter substrates are composed of ceramic-like materials such as cordierite, alpha.-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. Suitable wall flow substrates are formed from cordierite and silicon carbide. Such materials are able to withstand the environment, particularly high temperatures, encountered in treating the exhaust streams.

Wall flow filters for use with embodiments of the invention can have a variety of porosities and mean pore sizes. In various embodiments, the wall flow filter has a porosity of at least about 40% or in the range of about 40% to about 80%. The wall flow filter of some embodiments has a mean pore size of at least 5 microns or in the range of about 5 microns to about 30 microns. In one or more embodiments, the substrate is a high filtration efficiency filter. A high filtration efficiency filter removes 85% or more of the soot particles on a mass basis.

Emissions Treatment Systems

Figure 5:
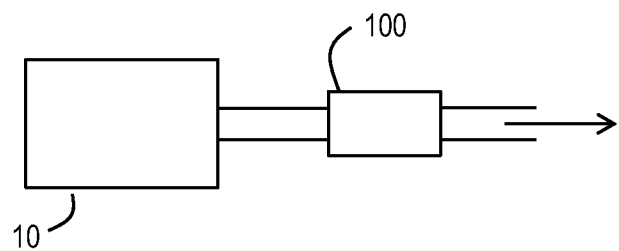
FIG. 5 shows a schematic of an exhaust treatment system in accordance with one or more embodiments of the invention.
Figure 6:
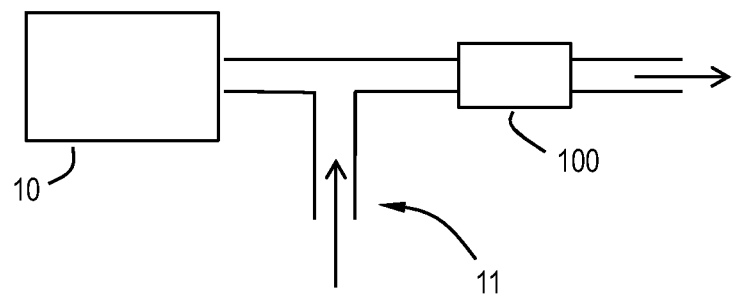
FIG. 6 shows a schematic of an exhaust treatment system in accordance with one or more embodiments of the invention.

An aspect of the invention is directed to emissions treatment systems for treating exhaust gases. FIG. 5 shows an embodiment of the invention in which the catalytic article 100 described above is located downstream of and in flow communication with the engine 10. In one or more embodiments of the invention, the emission treatment system consists essentially of an engine 10 with the catalytic article 100 described downstream of and in flow communication with the engine 10. As used in this specification and the appended claims, the term "consists essentially of" means that additional components may be included so long as they do not add other catalysts. For example, FIG. 6 shows an emission treatment system consisting essentially of an engine 10 with a downstream catalytic article 100 as described above. A reductant injector 11 system is located between and in flow communication with the exhaust stream between the engine 10 and the catalytic article 100. The inclusion of the reductant injector 11 does not add other catalysts to the system, merely a reactant.

Figure 7:
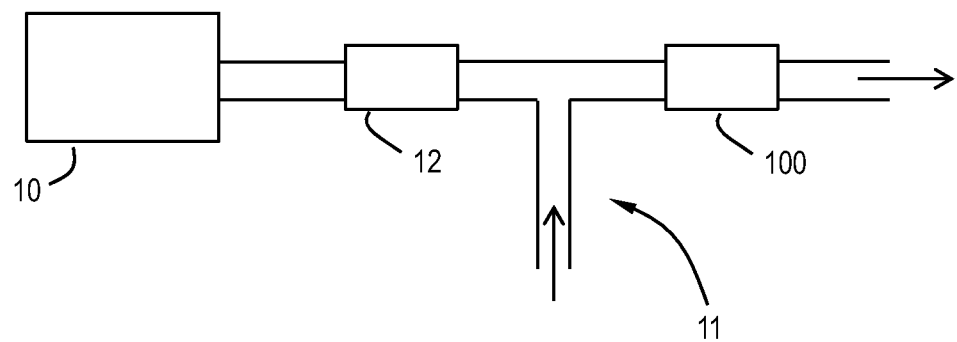
FIG. 7 shows a schematic of an exhaust treatment system in accordance with one or more embodiments of the invention.

FIG. 7 shows another embodiment of the invention in which a diesel oxidation catalyst 12 is positioned downstream of and in flow communication with the engine 10. The diesel oxidation catalyst 12 is positioned upstream of and in flow communication with the catalytic article 100. Exhaust gases exiting the engine 10 pass through the diesel oxidation catalyst 12 to the catalytic article 100 as described above. In one or more embodiments, the emissions treatment system consists essentially of a diesel oxidation catalyst downstream of an engine and upstream of the catalytic article as described herein and in flow communication with both.

Figure 8:
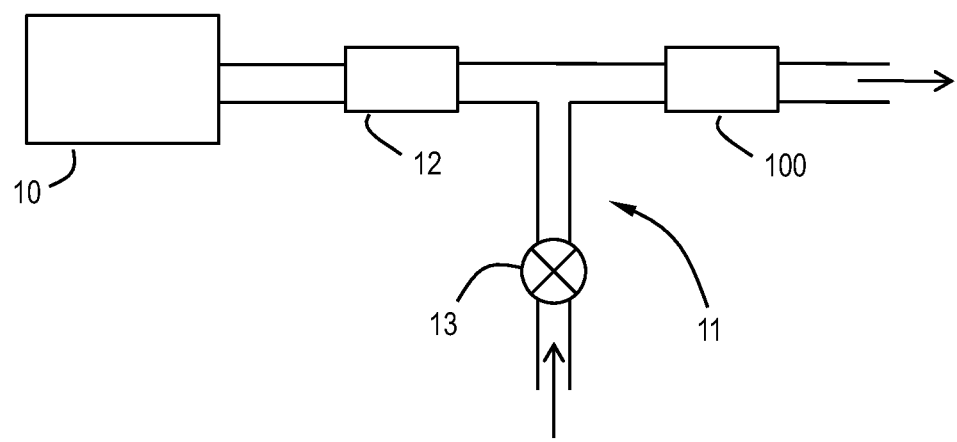
FIG. 8 shows a schematic of an exhaust treatment system in accordance with one or more embodiments of the invention.

FIG. 8 shows an embodiment of the invention. Exhaust gases from engine 10 pass through a diesel oxidation catalyst 12 positioned downstream of and in flow communication with the engine 10. The exhaust gases exiting the diesel oxidation catalyst 12 are combined with a reductant from a reductant injector 11 positioned downstream of the diesel oxidation catalyst 12 and upstream of the catalytic article 100 described herein. This effluent passes through the catalytic article 100 before being exhausted from the exhaust system. The reductant injector 11 can be configured to inject, for example, hydrocarbons, on-board fuel, a reductant, air, urea or ammonia. A heater, burner or ignition source may also be included in the reductant injector 11. In some embodiments, the reductant injector 11 includes a metering device 13 which is configured to control the amount of material injected into the exhaust gas stream upstream of the catalytic article 100.

Treatment of Exhaust Stream

Additional embodiments of the invention are directed to methods of treating an exhaust gas stream comprising soot, urea, ammonia, $NO_x$, CO and hydrocarbons. Referring again to FIGS. 3 and 4, the hydrolysis of urea is promoted a hydrolysis catalyst 110 located at an inlet end 54 of inlet channels 64 of a catalytic article 100. The soot is filtered from the gas stream after the hydrolysis catalyst 110 by passing the gas stream through a gas permeable wall 53. Filtering the gas stream results in the formation of a filter cake on the inlet wall 65 of the inlet channel 64. The ammonia and $NO_x$ are reacted to form $N_2$ in the presence of and promoted by a selective catalytic reduction catalyst 120 permeating the gas permeable wall 53 of the catalytic article 100. The ammonia in the gas stream exiting the gas permeable wall 53 is oxidized in the presence of and promoted by an ammonia oxidation catalyst 130 coated on the outlet walls 67. The CO and hydrocarbons are oxidized to form carbon dioxide and water in the presence of and promoted by an oxidation catalyst 140 coated on the outlet walls 67 at an outlet end 56 of the catalytic article. In some embodiments, with reference to FIG. 4, some of the soot is oxidized in the presence of and promoted by a soot oxidation catalyst 150 before the selective catalytic reduction catalyst 120. In some embodiments, the soot is oxidized after formation of the filter cake.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. A catalytic article to remove emissions from a gas stream containing soot, ammonia, an ammonia precursor, $NO_x$, CO and hydrocarbons, the article comprising:
    a wall-flow filter for trapping soot in the gas stream, the filter having an inlet end and an outlet end defining an overall length, gas permeable walls having a thickness formed into a plurality of axially extending inlet channels and outlet channels, each inlet channel having inlet walls, an open inlet end and an outlet plug at the outlet end, each outlet channel having outlet walls, inlet plugs at the inlet end and an open outlet end, with each inlet channel having adjacent outlet channels;
    a selective catalytic reduction catalyst permeating the gas permeable walls, the selective catalytic reduction catalyst promoting the conversion of $NO_x$ in the gas stream to $N_2$ in the presence of excess oxygen;
    an ammonia oxidation catalyst coating a length of the outlet walls of the outlet channels that promotes the selective oxidation of ammonia to $N_2$ in the gas stream, wherein the ammonia oxidation catalyst extends up to about 50% of the overall length of the catalytic article; and
    an oxidation catalyst coated on a portion of the outlet walls of the outlet channels extending from the outlet end toward the inlet end that promotes the oxidation of CO and hydrocarbons to $CO_2$, wherein there is substantially no overlap of the oxidation catalyst on the ammonia catalyst.

2. The catalytic article of claim 1, wherein the oxidation catalyst extends from the outlet end a length of about the same as a length of the outlet plugs.

3. The catalytic article of claim 1, wherein the oxidation catalyst comprises a platinum group metal on a high surface area support.

4. The catalytic article of claim 1, further comprising an hydrolysis catalyst that promotes the hydrolysis of the ammonia precursor, the hydrolysis catalyst coated on a portion of the inlet walls of the inlet channels extending from the inlet end.

5. The catalytic article of claim 1, wherein the selective catalytic reduction catalyst extends along the entire length of the wall flow filter.

6. The catalytic article of claim 1, wherein the selective catalytic reduction catalyst has a loading in the range of about 0.25 g/in$^3$ to about 2.5 g/in$^3$.

7. The catalytic article of claim 1, wherein the selective catalytic reduction catalyst comprises a metal promoted molecular sieve.

8. The catalytic article of claim 7, wherein the molecular sieve comprises a zeolite having a framework selected from the group consisting of CHA, FAU, BEA, MFI, MOR and combinations thereof.

9. The catalytic article of claim 7, wherein the molecular sieve comprises a zeolite with a CHA framework, an SAR greater than about 15.

10. The catalytic article of claim 9, wherein the molecular sieve comprises copper in an amount greater than about 0.2 wt %.

11. A catalytic article to remove emissions from a gas stream containing soot, ammonia, an ammonia precursor, $NO_x$, CO and hydrocarbons, the article comprising:
- a wall-flow filter for trapping soot in the gas stream, the filter having an inlet end and an outlet end defining an overall length, gas permeable walls having a thickness formed into a plurality of axially extending inlet channels and outlet channels, each inlet channel having inlet walls, an open inlet end and an outlet plug at the outlet end, each outlet channel having outlet walls, inlet plugs at the inlet end and an open outlet end, with each inlet channel having adjacent outlet channels;
- a selective catalytic reduction catalyst permeating the gas permeable walls, the selective catalytic reduction catalyst having a loading the range of about 0.25 g/in$^3$ to about 2.5 g/in$^3$ and promoting the conversion of $NO_x$ in the gas stream to $N_2$ in the presence of excess oxygen;
- an ammonia oxidation catalyst coating a length of the outlet walls of the outlet channels that promotes the selective oxidation of ammonia to $N_2$ in the gas stream; and
- an oxidation catalyst coated on a portion of the outlet walls of the outlet channels extending from the outlet end toward the inlet end that promotes the oxidation of CO and hydrocarbons to $CO_2$.

12. The catalytic article of claim 11, wherein the selective catalytic reduction catalyst comprises a metal promoted molecular sieve.

13. The catalytic article of claim 12, wherein the molecular sieve comprises a zeolite having a framework selected from the group consisting of CHA, FAU, BEA, MFI, MOR and combinations thereof.

14. The catalytic article of claim 12, wherein the molecular sieve comprises a zeolite with a CHA framework, an SAR greater than about 15.

15. The catalytic article of claim 11, wherein the ammonia oxidation catalyst extends from the oxidation catalyst up to about 50% of the overall length of the catalytic article.

16. A catalytic article to remove emissions from a gas stream containing soot, ammonia, an ammonia precursor, $NO_x$, CO and hydrocarbons, the article comprising:
- a wall-flow filter for trapping soot in the gas stream, the filter having an inlet end and an outlet end defining an overall length, gas permeable walls having a thickness formed into a plurality of axially extending inlet channels and outlet channels, each inlet channel having inlet walls, an open inlet end and an outlet plug at the outlet end, each outlet channel having outlet walls, inlet plugs at the inlet end and an open outlet end, with each inlet channel having adjacent outlet channels;
- a selective catalytic reduction catalyst permeating the gas permeable walls, the selective catalytic reduction catalyst promoting the conversion of $NO_x$ in the gas stream to $N_2$ in the presence of excess oxygen;
- a soot oxidation catalyst upstream of the selective catalytic reduction catalyst;
- an ammonia oxidation catalyst coating a length of the outlet walls of the outlet channels that promotes the selective oxidation of ammonia to $N_2$ in the gas stream; and
- an oxidation catalyst coated on a portion of the outlet walls of the outlet channels extending from the outlet end toward the inlet end that promotes the oxidation of CO and hydrocarbons to $CO_2$.

17. The catalytic article of claim 16, wherein the soot oxidation catalyst permeates the gas permeable walls.

18. The catalytic article of claim 17, wherein the soot oxidation catalyst comprises a layer permeating an inlet side of the gas permeable walls.

19. The catalytic article of claim 18, wherein the layer permeates the gas permeable walls to a depth up to about 50% of the wall thickness.

20. The catalytic article of claim 16, wherein the soot oxidation catalyst comprises a layer on the inlet walls.

21. The catalytic article of claim 16, wherein the soot oxidation catalyst comprises zirconia stabilized cerium oxide.

22. A catalytic article to remove emissions from a gas stream containing soot, ammonia, an ammonia precursor, $NO_x$, CO and hydrocarbons, the article comprising:
- a wall-flow filter for trapping soot in the gas stream, the filter having an inlet end and an outlet end defining an overall length, gas permeable walls having a thickness formed into a plurality of axially extending inlet channels and outlet channels, each inlet channel having inlet walls, an open inlet end and an outlet plug at the outlet end, each outlet channel having outlet walls, inlet plugs at the inlet end and an open outlet end, with each inlet channel having adjacent outlet channels;
- a selective catalytic reduction catalyst permeating the gas permeable walls, the selective catalytic reduction catalyst promoting the conversion of NO in the gas stream to $N_2$ in the presence of excess oxygen;
- an ammonia oxidation catalyst coating a length of the outlet walls of the outlet channels that promotes the selective oxidation of ammonia to $N_2$ in the gas stream; and
- an oxidation catalyst coated on a portion of the outlet walls of the outlet channels extending from the outlet end up to about 2 inches toward the inlet end, the oxidation catalyst promoting the oxidation of CO and hydrocarbons to $CO_2$.

23. A catalytic article to remove emissions from a gas stream containing soot, ammonia, an ammonia precursor, $NO_x$, CO and hydrocarbons, the article comprising:
- a wall-flow filter for trapping soot in the gas stream, the filter having an inlet end and an outlet end defining an overall length, gas permeable walls having a thickness formed into a plurality of axially extending inlet channels and outlet channels, each inlet channel having inlet walls, an open inlet end and an outlet plug at the outlet end, each outlet channel having outlet walls, inlet plugs at the inlet end and an open outlet end, with each inlet channel having adjacent outlet channels;
- a selective catalytic reduction catalyst permeating the gas permeable walls, the selective catalytic reduction catalyst promoting the conversion of $NO_x$ in the gas stream to $N_2$ in the presence of excess oxygen;
- an ammonia oxidation catalyst coating a length of the outlet walls of the outlet channels that promotes the selective oxidation of ammonia to $N_2$ in the gas stream; and
- an oxidation catalyst coated on a portion of the outlet walls of the outlet channels extending from the outlet end toward the inlet end that promotes the oxidation of CO and hydrocarbons to $CO_2$, wherein there is substantially no overlap of the oxidation catalyst on the ammonia catalyst, and wherein the ammonia oxidation catalyst extends from the oxidation catalyst up to about 50% of the overall length of the catalytic article.

24. The catalytic article of claim 23, further comprising a hydrolysis catalyst that promotes the hydrolysis of the ammonia precursor, the hydrolysis catalyst coated on a portion of the inlet walls of the inlet channels extending from the inlet end.

25. The catalytic article of claim 24, wherein the selective catalytic reduction catalyst has a loading in the range of about 0.25 g/in$^3$ to about 2.5 g/in$^3$.

\* \* \* \* \*